June 15, 1937.   J. M. WHELTON   2,083,583
ASSEMBLING AND MOLDING MACHINE
Filed Nov. 16, 1934   5 Sheets-Sheet 1

INVENTOR
John M. Whelton
By his Attorney
Victor Cobb

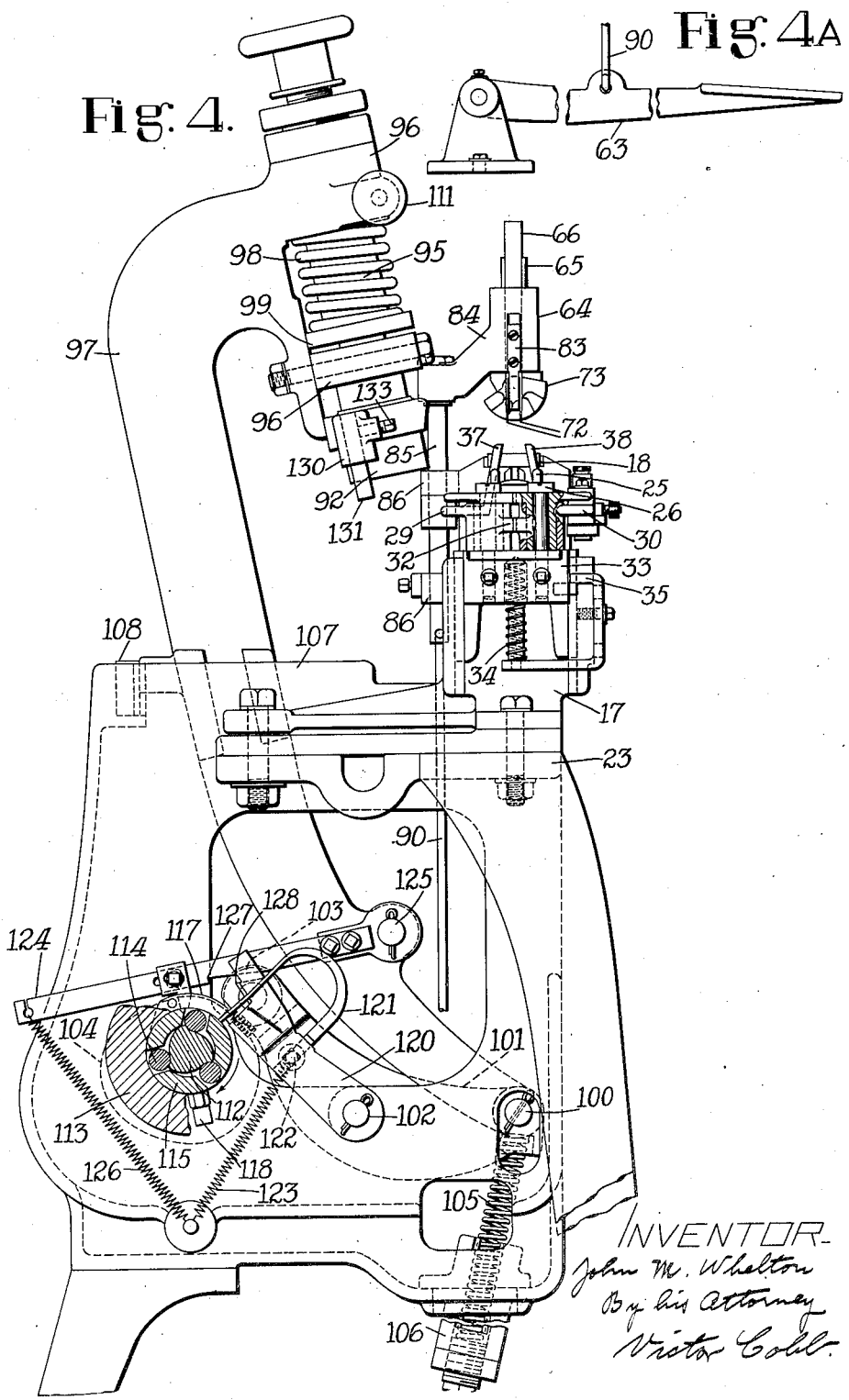

June 15, 1937.  J. M. WHELTON  2,083,583
ASSEMBLING AND MOLDING MACHINE
Filed Nov. 16, 1934   5 Sheets-Sheet 3
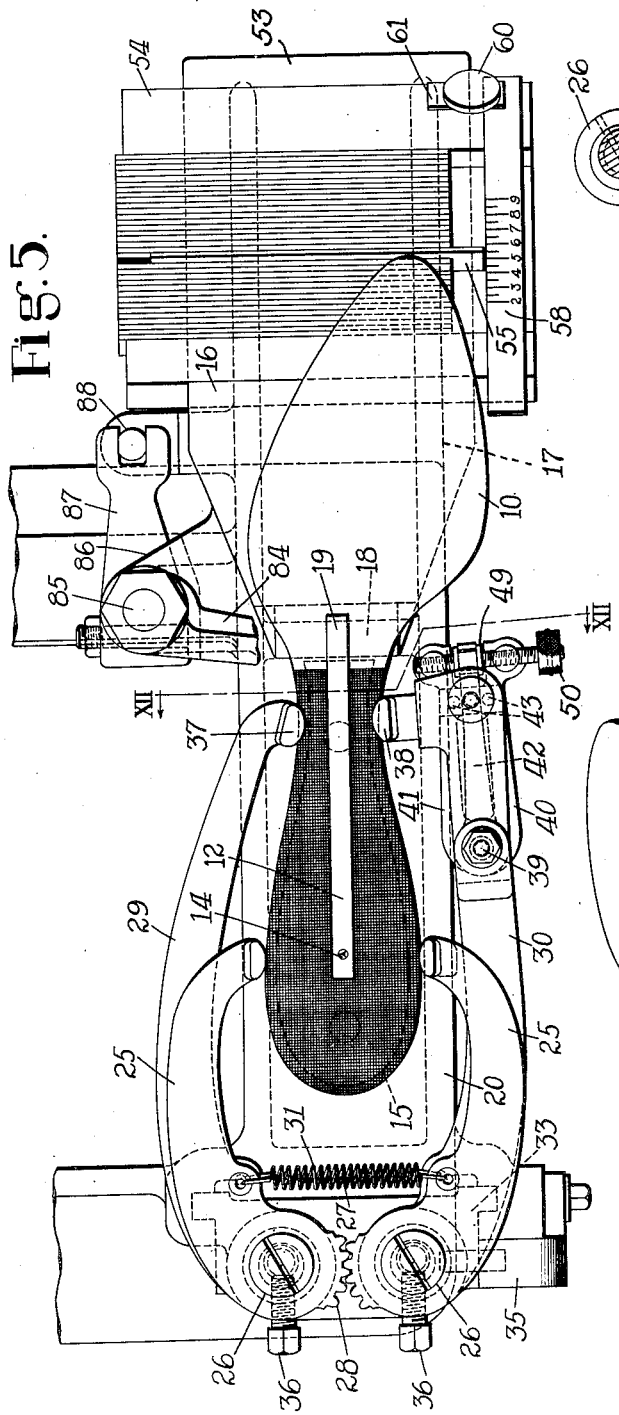
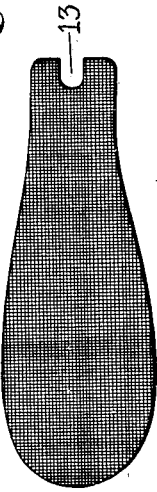
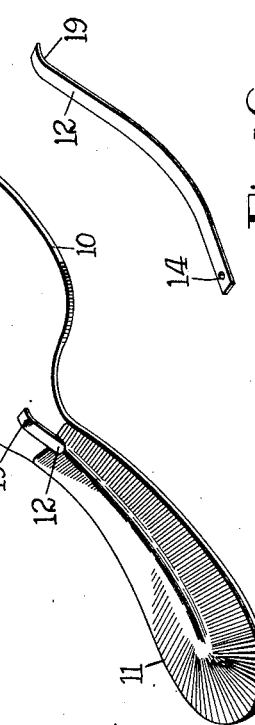

June 15, 1937.    J. M. WHELTON    2,083,583
ASSEMBLING AND MOLDING MACHINE
Filed Nov. 16, 1934    5 Sheets-Sheet 4
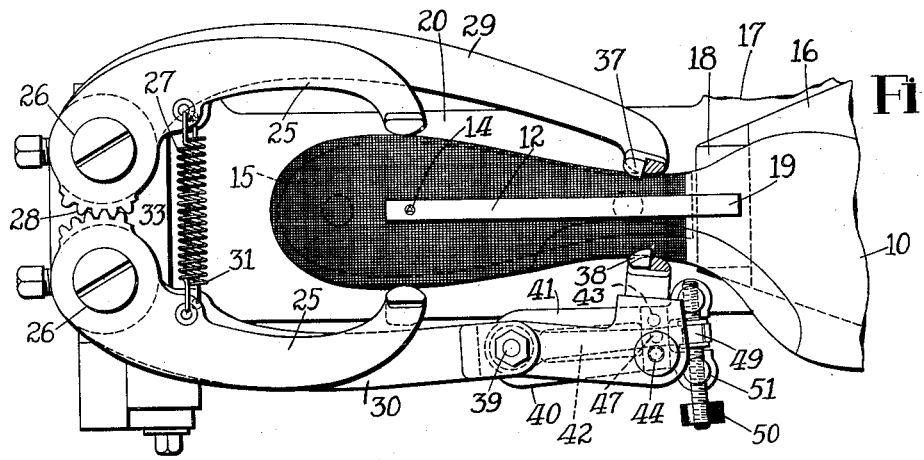
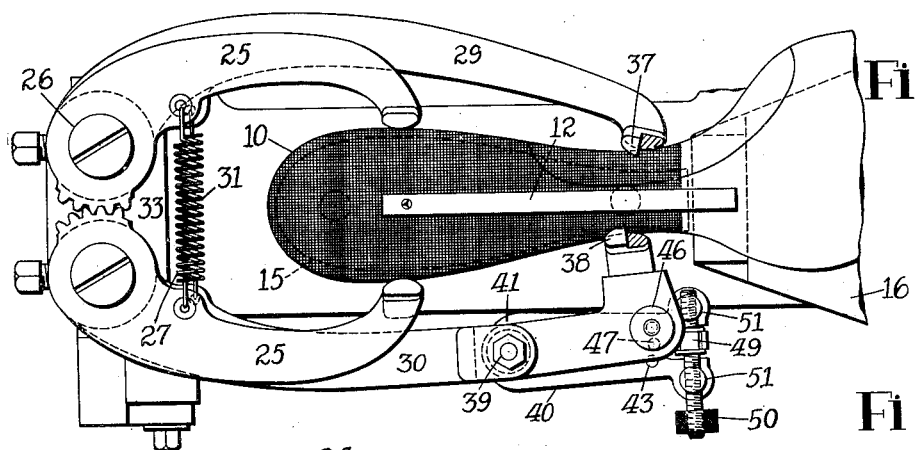
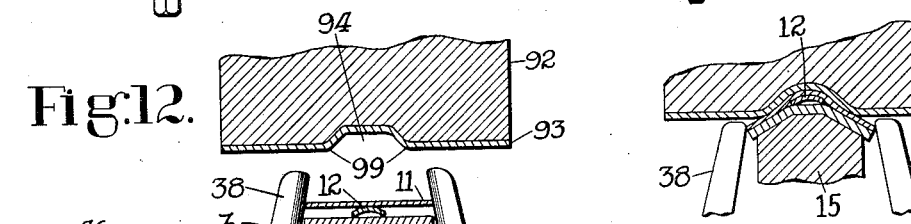
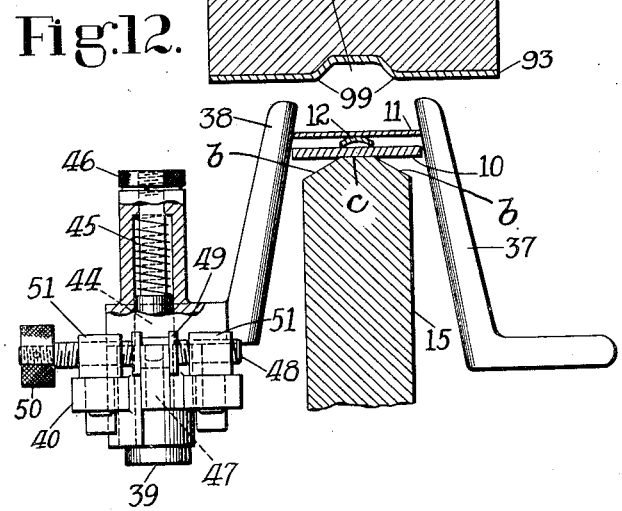
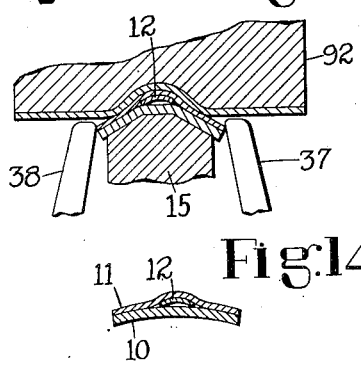
INVENTOR-
John M. Whelton
By his Attorney
Victor Cobb June 15, 1937. J. M. WHELTON 2,083,583
ASSEMBLING AND MOLDING MACHINE
Filed Nov. 16, 1934  5 Sheets-Sheet 5
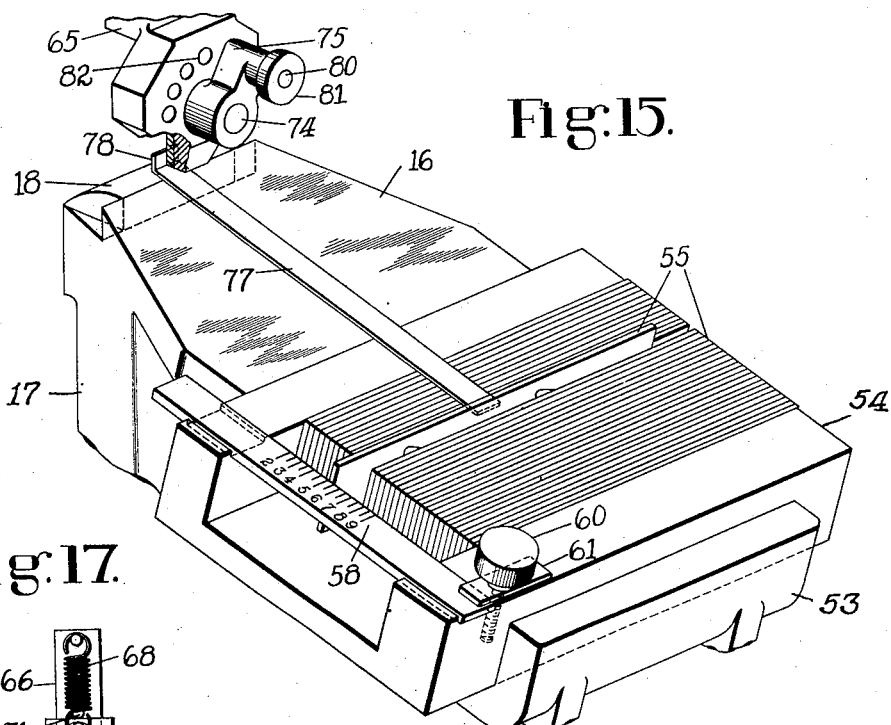
Fig. 15.
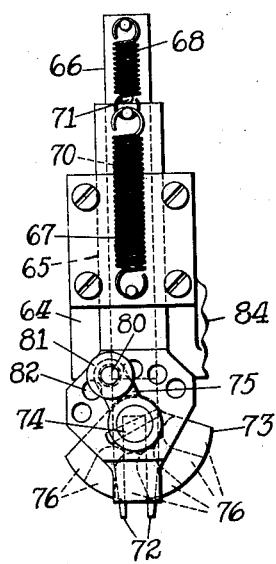
Fig. 17.
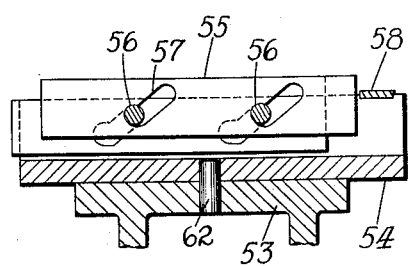
Fig. 18.
Fig. 16.
INVENTOR
John M. Whelton
By his attorney
Victor Colt Patented June 15, 1937

2,083,583

UNITED STATES PATENT OFFICE 2,083,583

ASSEMBLING AND MOLDING MACHINE

John M. Whelton, Peabody, Mass., assignor to United Shoe Machinery Corporation, Paterson, N. J., a corporation of New Jersey Application November 16, 1934, Serial No. 753,367

34 Claims. (Cl. 12—17)

This invention relates to apparatus for use in assembling shoe parts and is herein disclosed as embodied in apparatus designed to expedite the practices set forth in my copending application Serial No. 669,842, filed May 8, 1933, and to insure precision with respect to the relation in which the shoe parts are assembled. More specifically the invention is concerned with assembling and molding the parts of composite shoe-bottom units each comprising a moldable sole, a moldable reinforcing piece such as compressed sheet fiber, and an intermediate steel shank-stiffener previously arched to conform to the longitudinal arch of the bottom of a last of a predetermined style.

It has been found in practicing the method set forth in the aforesaid application that satisfactory results, particularly in women's high-arch shoes, require the utmost precision with respect to the distance from the toe-end of a sole to the shank-stiffener assembled therewith, since, if the shank-stiffener of such a unit is too near or too far from the toe-end of the sole the arch formation of the shank-stiffener will not coincide exactly with that of the last when the forepart of the sole is located exactly in register with the forepart of the last. The problem of locating the shank-stiffener exactly in the desired relation to the sole is complicated by non-constant factors such as various sizes and various styles of the lasts and soles to be used and corresponding differences in the lengths and curvatures of the shank-stiffeners, but irrespective of those factors the problem of locating a shank-stiffener and a sole in the correct relation is followed by the problem of maintaining that relation while a reinforcing piece is being assembled therewith and while the three component parts of the assemblage are being permanently joined.

In accordance with the practices set forth in the aforesaid application the joining of the component parts of a shoe-bottom unit is predicated upon the presence of a coating of an adhesive substance, such as latex, on one or both of the confronting faces of the sole and the reinforcing piece which is of a shape and size to cover the heel-seat portion and the shank-portion of the sole. Moreover, the steel shank-stiffener, which lies between the sole and the reinforcing piece, is maintained in its established relation by adhesion of the margins of the sole and the reinforcing piece which are brought into contact with each other by the operation of suitable pressure-applying mechanism. Additional security of the shank-stiffener may be obtained by providing it with one or more spurs which are preferably arranged to become embedded in the reinforcing piece in consequence of pressure applied to effect adhesion of the parts.

To provide for rapidity and precision in assembling and securing the parts of such composite shoe-bottom units, the present invention has been developed and embodied in an apparatus organized as herein shown and described.

One feature of the invention consists in improved means by which the endwise positions of soles of various styles and sizes may be accurately established with respect to the supporting means on which the component elements of the work are to be assembled.

Another feature consists in improved means by which the widthwise positions of soles of various styles and sizes may be accurately established.

Still another feature consists in improved means for locating shank-stiffeners superposed upon the soles. Preferably, and as herein shown, this feature is embodied in a construction by which a sole may be clamped against a support or platen to maintain its established location until all the necessary operations have been completed.

The invention also provides means for clamping a shank-stiffener against the sole to maintain its established location. Moreover, as shown, the aforesaid means for locating the shank-stiffener and that for clamping it are so combined as to derive their effective motions from a common actuator such as a treadle.

Still another feature of the invention consists in the provision of pressure-applying mechanism that will not only effect permanent security of the component parts of shoe-bottom units in their established relations but will also, at the same time, mold the sole and the reinforcing piece to conform to the longitudinal arch or curvature of the shank-stiffener and mold both the sole and the reinforcing piece transversely, to the end that a shoe-bottom unit thus constituted and molded will conform to the longitudinal and transverse profiles of the heel-seat portion and the shank-portion of a last without requiring any subsequent or additional molding. With an assembling organization comprising this feature the desired molding of the parts may be effected incidentally but prior to setting up the bond of adhesion between them.

Preferably and as herein shown, the form for molding the shank portion and the heel-seat portion of a sole is provided with two oppositely sloping surfaces of graduated steepness for engaging the marginal areas of the shank portion, and with a median surface connecting them and forming sharply defined angles at its intersections with them. When a sole is molded against such a form its bends are localized at or near the intersections or angles mentioned. Then, if a reinforcing piece is molded against the sole, the marginal portions of that piece and of the sole will creep relatively to each other as the molding progresses until the ultimate degree of molding is effected, whereupon the maximum molding pressure is developed. Now, assuming that the contacting faces of the sole and of the reinforcing piece have coatings of an adhesive substance, their bond of adhesion becomes fully established after all relative creeping of the marginal portions has been caused. Consequently, the bond of adhesion, having been set up while the sole and the reinforcing piece are both molded, retains its full strength to resist reflex action of the parts thus bonded.

The invention also provides an improved feature of organization comprising cooperative molding elements, one of which is movable laterally to and from register with the other, power-operated mechanism including a one-revolution clutch arranged to operate the movable molding element, and clutch-controlling mechanism responsive to lateral movement of the movable molding element to trip the clutch and set the mechanism in operation in consequence of moving that element into register with its counterpart.

Referring to the drawings,

Fig. 4 is a side elevation, partly in section, of the organization represented in Fig. 1;

Fig. 4A is a side elevation of a treadle for operating a rod that appears in Fig. 4;

Fig. 5 is a top plan view on a larger scale including a sole, a superposed shank-stiffener and some of the gaging devices for locating them in certain relations to the molding mechanism;

Fig. 6 is a perspective view of an arched shank-stiffener;

Fig. 7 is a plan view of a reinforcing piece intended to be superposed upon the sole and the shank stiffener when assembled as represented in Fig. 5, the reinforcing piece being inverted to afford a view of the coating of adhesive substance with which one of its faces is provided;

Fig. 8 is a perspective view of a composite shoe-bottom unit comprising a sole, a reinforcing piece, and an intermediate shank-stiffener, the sole and the reinforcing piece having been adhesively united and molded by the apparatus to be described;

Fig. 9 is an inverted sectional plan view of one of the eccentric pivot-studs included in Fig. 5;

Fig. 10 is a top plan view similar to Fig. 5 but showing a different adjustment of one of the sole-locating members for a special type of shoe-bottom unit intended for a right shoe;

Fig. 11 is a view similar to Fig. 10 but showing still another adjustment of one of the sole-locating members for the same special type of shoe-bottom unit intended for a left shoe;

Fig. 12 is a vertical cross-section through the molding elements about to apply molding pressure to the assembled parts of a composite shoe-bottom unit, the location of the section being indicated by line XII—XII in Fig. 5;

Fig. 13 is a sectional view similar to Fig. 12 of the cooperative molding elements in the act of performing their molding operation;

Fig. 14 is a cross-section through the shank-portion of a composite shoe-bottom unit that has been molded and removed from the molding elements;

Figure 1:
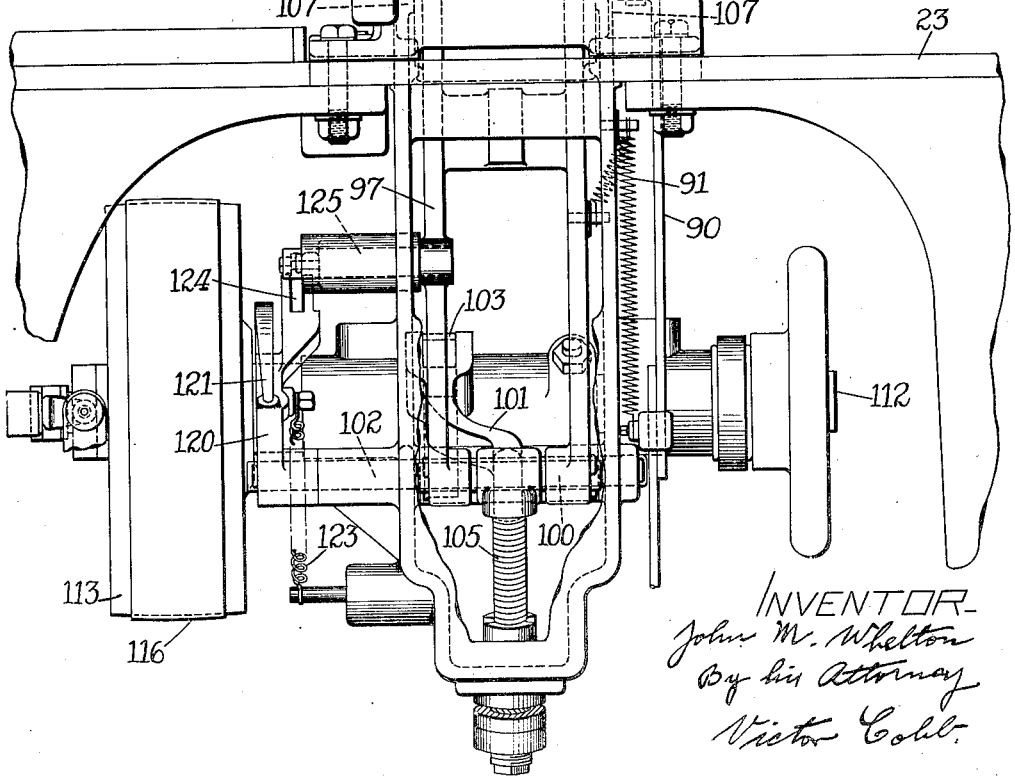
Fig. 1 is a front elevation of an assembling and molding machine embodying the several features of the present invention, the view omitting portions of the legs of the frame structure.

Fig. 15 is a perspective view including a sole-gaging device represented in Figs. 1 and 5. This view also includes a gaging device for locating the forward end of a shank-stiffener at a certain point on a sole. The view illustrates the manner in which a template or measuring strip may be used to determine the correct setting of the gaging device according to a given style of shoe-bottom unit;

Fig. 16 is a cross-sectional view of the sole-gaging device represented in Fig. 15 (see line XVI—XVI in Fig. 1);

Fig. 17 is a side elevation of a movable assemblage for locating a shank-stiffener; and Fig. 18 is a sectional view representing a development of the stepped formation of the shank-stiffener gage included in Fig. 15.

A shoe-bottom unit of the type herein illustrated comprises an insole 10 of moldable material, a reinforcing piece 11 of moldable material such as compressed sheet fiber, and an intermediate shank-stiffener 12 of steel suitably arched to conform to the arch of a last of a predetermined style. Although the reinforcing piece is used only to reinforce the heel-seat portion and the shank-portion of a sole it is cut to a shape and size that will match the sole to which it is to be attached. At some prior stage of manufacture one surface of each reinforcing piece 11 and the corresponding area of one surface of each insole are preferably coated with a suitable adhesive such as latex which is represented by shading in Figs. 5 and 7. Preferably the reinforcing pieces are graded as to length so that their forward ends will not extend quite to the ball-lines of the soles or cover the forward ends of the shank-stiffeners. Moreover, the forward end of each reinforcing piece is preferably provided with a notch 13, the width of which is just equal to that of a shank-stiffener 12. When the parts are assembled and united the forward end of a shank-stiffener occupies this notch and is thus maintained against lateral displacement.

The rear end of each shank-stiffener 12 is preferably provided with one or more spurs 14 projecting from the surface against which the reinforcing piece 11 is to lie, to the end that these spurs may be embedded in the reinforcing piece rather than in the sole. In practice a group of three or four small spurs is formed by puncturing the shank-stiffener with a small pointed punch which usually splits the displaced metal into individual prongs or spurs.

The usual procedure in assembling the parts 10, 11 and 12 to form a composite bottom unit as shown in Fig. 8 is substantially as follows. The operator, having first selected soles of a certain size and of a given style, and reinforcing pieces and shank-stiffeners to match them, first places a sole, coated side up on a molding bed or platen in the machine hereinafter described, and locates the sole in a certain predetermined relation to the platen with the aid of suitable gaging devices provided for that purpose. Having established the desired location of the sole he depresses a treadle by which a small movable assemblage is brought down in a fixed path and pressed upon the sole in the region of the ball-line. This movable assemblage includes means for clamping the sole against the platen, means for locating a shank-stiffener by its forward end in a certain relation to the sole, and means by which the shank-stiffener may be clamped against the sole. Having depressed this assemblage far enough to clamp the sole and place the gaging means in contact with its upper surface, the operator superposes a shank-stiffener 12 on the sole and in contact with the gaging means whereby the forward end of the shank-stiffener is located exactly at a predetermined distance from the toe-end of the sole and by which the shank-stiffener is located widthwise. Now, by depressing the treadle slightly more, the operator causes a member of the movable assemblage to bear upon the upper surface of the shank-stiffener to clamp the latter against the clamped sole.

Next, the operator superposes a reinforcing piece 11, coated side down, upon the shank stiffener and with one finger locates the rear end of the reinforcing piece in register with the rear end of the sole. At this stage widthwise register of the reinforcing piece is obtained by the same members that register the sole widthwise relatively to the molding bed or platen.

The component parts of a bottom unit having been thus assembled, the operator shifts a movable presser of the machine from its initial position out of register with the molding bed or platen into its operative position where it overlies the assembled elements of the work. The act of shifting the movable presser to its operative position trips a clutch by which power-operated mechanism is set in operation to depress the presser against the assembled parts with sufficient pressure to mold the sole and the reinforcing piece and to embed the spurs 14 of the shank-stiffener into the reinforcing piece. The clutch is controlled by mechanism that throws it out of operation automatically at the end of one revolution. Consequently, the power-operated molding mechanism comes to rest when the presser has risen after once applying molding pressure. The operator now releases the presser which retires automatically from its operative position, releases the treadle by which the shank-stiffener and the sole are clamped, and removes the assembled and molded bottom unit from the machine.

Figure 2:
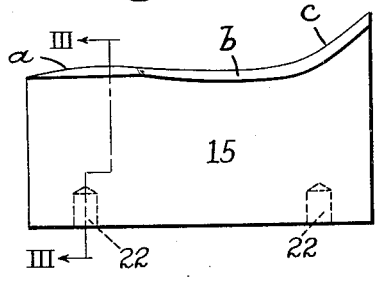
Fig. 2 is a front elevation of a molding block or form of the type included in Fig. 1.
Figure 3:
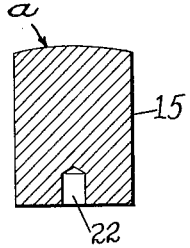
Fig. 3 is a vertical cross-section through the heel-seat portion of the block represented in Fig. 2.

The illustrated machine is provided with a work-supporting bed or platen which preferably comprises a plurality of sections, one of which is shown separately in Figs. 2 and 3 and is indicated by the numeral 15. This section may be a block of wood, the upper surface of which is specially formed to mold a sole and comprises a spheroidal surface a for molding the heel-seat portion, two oppositely sloping surfaces b, b for molding the margins of the shank portion, and a median surface c connecting the sloping surfaces and forming sharply defined angles at its intersections with them. The median surface c is relatively narrow in comparison with the sloping surfaces, its width being about equal to that of a shank-stiffener or slightly more. These molding surfaces are curved lengthwise in accordance with the longitudinal curvatures of the bottom of a last of a given style, but one such molding block or form will suffice for all sizes of one style. The pitch of the sloping surfaces is graduated, being less steep adjacent to the spheroidal heel-seat surface a and steeper in the region corresponding to the arch of a last.

The work-supporting bed or platen also includes a flat portion 16 of a cast-iron frame 17, and a steel block 18 embedded therein at a point where it will engage a sole in the region of the ball-line. The work-engaging surface of the block 18 is convex and its curvature approximates that of the sharp bend 19 (Fig. 6) at the forward end of a shank-stiffener. This feature of construction provides for alternative use of interchangeable blocks 18 having dissimilar curvatures to suit corresponding formations of lasts and shank-stiffeners of different styles.

The frame 17 is provided with a flat surface 20 to provide a seat for the molding block 15, and this flat surface is provided with upstanding dowels 21 adapted to project into corresponding holes 22 (Fig. 3) bored in the bottom of the block. Thus, a block 15, irrespective of its style characteristics, may be located and maintained in a certain cooperative relation to the other sections of which the work-supporting platen is composed, and the heel-seat portion of the block will be sustained at a level offset from the plane of the forepart section 16 in accordance with the offset relation of the corresponding portions of a last.

When a block 15 is mounted as shown in Fig. 1 it stands between two pairs of jaws by which the sole and the reinforcing piece 11 of a composite unit are both registered widthwise in a certain predetermined relation to the block, see Fig. 5. The jaws 25 of one pair are relatively short and their work-engaging portions are arranged to engage the side edges of a sole and a reinforcing piece at the widest part of the heel-seat. These jaws are pivotally mounted on individual fulcrum studs 26 and are connected one with the other by a tension spring 27 that normally causes them to clamp the work interposed between them. They are otherwise connected in articulated relation by segments of gear-teeth 28 that communicate angular motion from one jaw to the other and equalize their movements. As shown in Fig. 4, the hubs of these jaws are nested in the hubs of the longer jaws 29 and 30 and furnish the bearing surfaces about which the longer jaws may swing. The longer jaws are likewise connected by a tension spring 31 that causes their work-engaging portions normally to clamp the edges of a sole and a reinforcing piece at or near the narrowest point of the shank-portion, and these jaws also have cooperative gear segments 32 (Fig. 4) by which their angular motions are communicated from one to the other and equalized.

This assemblage of jaws is mounted upon a vertically movable carriage 33 having tongue-and-groove connection with the frame 17 as represented in dotted lines in Fig. 5. The carriage 33 is normally maintained in its highest position by a compression spring 34 (Fig. 4) at which position it is arrested by an abutment 35 in the path of a pin projecting from the carriage. For purposes of assembling the component parts of a shoe-bottom unit the carriage 33 and the jaws carried thereby remain at their highest level, at which time the work-engaging portions of the jaws project above the level of the work lying on the block 15, but when the presser of the molding apparatus is brought into operation as hereinafter described the carriage 33 and the jaws are depressed automatically to a lower level, to the end that the jaws shall not obstruct the downward movement of the presser by which the work is molded against the block 15.

The lower ends of the fulcrum studs 26 are of reduced diameter and are secured by set-screws 36 (Fig. 5) in sockets bored in the carriage 33. Moreover, these reduced lower ends of the studs are preferably eccentric (Fig. 9) with respect to the upper portions on which the work-engaging jaws are mounted, to the end that rotational adjustment of the studs will be effective, when the set-screws 36 are relaxed, to rectify any slight machining discrepancy that might otherwise place the jaws at unequal distances from the longitudinal median line of the molding block 15.

As shown in Figs. 5, 10, 11 and 12, the construction of the jaw 30 embodies certain features not duplicated in the companion jaw 29 which comprises only a single part or member including an integral upstanding work-engaging finger 37. On the other hand, the work-engaging finger 38 of the jaw 30 is an individual member connected to the jaw by a pivot-stud 39 and capable of being adjusted with angular movement about the pivot-stud. Two angularly adjustable socket-members 40 and 41 are also carried by the jaw 30 and connected thereto by the pivot-stud 39. These socket members lie at opposite sides of an integral extremity 42 of the jaw 30 and each of them is provided with a socket 43 to receive a locking pin 44 that occupies a bore in the finger 38. The locking pin 44 is normally depressed by a compression spring 45 (Fig. 12) and its upper end is provided with a head or knob 46 by which it may be raised to unlock the finger. The extremity 42 of the jaw 30 is provided with a socket 47 also adapted to receive the locking pin, the two sockets 43 and the intermediate socket 47 being arranged in an arc so that the pin 44 may be placed in any one of them.

For the general run of work the locking pin will be placed in the intermediate socket 47 which is located to maintain the member 38 in a constant position of adjustment in which the conjoint locating effect of the jaws 29 and 30 will be symmetrical. In other words, when the pin 44 is in the socket 47 the fingers 37 and 38 are equally distant from the longitudinal median line of the block 15. Under these conditions the fingers 37 and 38 will locate the sole so that the shank-stiffener will lie midway between the edges of the shank-portion of the sole as shown in Fig. 5.

On the other hand, when the locking pin 44 is shifted to the socket in the member 40 (Fig. 10) or to that in the member 41 (Fig. 11) the conjoint locating effect of the jaws 29 and 30 will be non-symmetrical because the shank-portion of the sole will be offset widthwise in one direction or the opposite from symmetrical relation to the location of the shank-stiffener. Thus, for assembling composite bottom units for a certain special type of shoe, the finger 38 will be set as shown in Fig. 10 to locate a right sole, and as shown in Fig. 11 to locate a left sole. In each of these settings the outer edge of the sole is located relatively near the shank-stiffener, while the inner edge is located farther from the shank-stiffener. These non-symmetrical settings of the fingers 37 and 38 do not affect the symmetrical effect of the jaws 25. Consequently, they produce the desired result by skewing the soles without appreciably offsetting the centers of their heel-seats. For work of this character the notches 13 in the reinforcing plates 11 are preferably located off center consistently with the desired off-center relation of the soles and the forward ends of the shank-stiffeners.

The sockets 43 may be adjusted toward and from the intermediate socket 47 by a double-acting screw 48 having a right-hand thread, a left-hand thread, an intermediate flanged collar 49, and a knob 50 by which it may be turned. Swiveled blocks 51, mounted respectively on the socket members 40 and 41, are bored and tapped, one with a right-hand thread and the other with a left-hand thread to engage the corresponding threads of the screw 48. The flanged collar 49 occupies a notch in the extremity 42 of the jaw 30 to prevent axial movement of the screw 48. Consequently, when the screw is turned it causes the socket members 40 and 41 to move equally toward and from each other.

As shown in Fig. 1 one of the shorter jaws 25 is provided with a downwardly extending lug 52 that lies behind the jaw 30 and is adapted to retract the latter from the molding block 15. Consequently, when the operator wishes to separate the jaws of both pairs to permit placing a sole between them he has only to retract the forward jaw 25 far enough to retract the jaw 30, since the rear jaws will also be retracted, but in the opposite direction, by the articulate connections 28 and 32 hereinbefore described. Assuming that the locking pin 44 of the work-engaging member 38 occupies the intermediate socket 47 of the jaw 30, the longitudinal median line of the heel-seat portion and the shank portion of a sole placed on the molding platen 15 will be located in register with the corresponding median line of the block 15 when the jaws are permitted to close against the interposed sole, and the sole will therefore take the position represented in Figs. 5 and 12.

It is necessary, moreover, to locate the sole lengthwise in a certain position with due regard to the length of the sole. For this purpose the machine is provided with a gaging device embodying certain novel features of construction that render it particularly suitable for work of the type under consideration.

As shown in Fig. 1, the forepart section 16 of the sole-supporting platen is provided with a jig comprising a cavity 53 for the reception of a toe-gaging device embodying certain novel features of construction illustrated also in Figs. 5, 15 and 16. This device comprises a rectangular frame 54, a series of gaging plates or abutments 55 of uniform thickness stacked in face-to-face contact with each other between upstanding walls or flanges of the holder 54, and two parallel rods or pins 56, each extending through all the plates or abutments 55 to support the latter, the ends of the pins being mounted in holes bored in the upstanding flanges of the holder. The organization is such that these plates are capable of individual edgewise movement but are not capable of any other movement. For this purpose, each plate is provided with two inclined slots 57 through which the pins 56 extend. The edges of these slots constitute cams for raising and lowering the plates in consequence of shifting them endwise. When the plates are all in their lowest positions their upper edges lie in the plane of the work-supporting surface of the bed 16, but when any one of the plates is raised it provides an abutment against which the toe-end of a sole may be placed to locate the sole endwise.

The thickness of each plate 55 corresponds to a half-size of a sole of a certain style. The sizes and half-sizes of soles of that style may be marked on a scale 58 which, as shown in Figs. 5 and 15, is provided by a strip of metal embedded in grooves formed in the upstanding walls of the holder 54. This strip is clamped to one of these walls by a thumb screw 60 and a clip 61. Assuming that the operator is about to set the toe-gaging device for assembling the parts of a shoe-bottom unit for size 5, he raises the corresponding plate 55 to its operative position by moving it endwise toward the scale. The inclined edges of the slots 57 in the plate so shifted cause that plate to rise above the other plates. Each slot 57 is provided with a land at its lower end which, upon being brought into engagement with the corresponding supporting pin 56, maintains the elevated gage-plate in its operative position.

The jig for locating the toe-gaging device may also include a dowel 62 (Fig. 16), and the holder 54 of the gaging device may be provided with a hole to receive the dowel. If the machine is to be used for assembling the parts of bottom units for lasts of different styles it may be supplemented by a plurality of interchangeable toe-gaging devices such as that shown. The only essential difference between a gaging device for one style and that for another style will be in the thickness of the individual plates 55 and the corresponding spacing of the marks of the scale 58 associated therewith. Once a scale 58 has been set in the correct position for soles of a certain style it will remain in that position, but under certain conditions two different styles may have the same gradation of sizes but not the same length of sole for corresponding sizes. In such cases the adjustability of the scale 58 provides for utilizing one gaging device for related styles as well as for different sizes of those styles.

When a sole has been located in the desired position on its supporting platen by the appropriate gage-plate 55 and the two pairs of jaws hereinbefore described, the operator depresses a treadle 63 (Fig. 4A) by which an assemblage of relatively movable members is depressed in a fixed path against the upper surface of the sole in the region of the ball-line, and the sole is thereby clamped against the section 18 of the platen and against the adjacent portion of the flat section 16 with sufficient pressure to bend the sole in conformity with the curvature of the section 18 and the bend 19 of a shank-stiffener. This clamping operation will serve to prevent the toe-end of the sole from springing out of engagement with the gage-plate 55 and will also prevent the heel-seat portion of the sole from springing out of engagement with the clamping jaws 25. Consequently, while one foot of the operator is used to maintain the sole under control on the platen both hands are relieved for other duties to follow.

The assemblage operated by the treadle 63 is shown in Figs. 1, 4 and 17. It comprises a vertically movable guide-block or head 64, a relatively movable bar 65 mortised therein and another relatively movable bar 66 mortised into the bar 65. The bar 65 is normally depressed relatively to the head 64 by a tension spring 67, while the bar 66 is normally depressed relatively to the bar 65 by a tension spring 68. A stop-pin 70 carried by the bar 65 is arranged to engage the upper surface of the head 64 to limit the downward sliding movement of that bar, while a similar stop-pin 71 carried by the bar 66 is arranged to engage the upper end of the bar 65 to limit relative downward movement of the bar 66.

The lower end of the bar 66 is forked to provide two fingers 72 having confronting parallel surfaces spaced apart a distance equal to the width of a shank-stiffener 12. One of their functions is to locate the shank-stiffener widthwise in a certain relation to the platen, but in addition to that function these fingers, when brought down upon the sole, not only clamp the sole against the section 18 of the platen but they are also instrumental in bending the sole over this section of the platen.

The lower end of the vertically movable slide 65 carries a gage 73 (Figs. 4, 17 and 18) for locating the bend 19 of the shank-stiffener 12 in register with the curve of the section 18 of the platen. This gage is affixed to a pin or rock-shaft 74 journaled in a bearing in the lower end of the slide 65 and is provided with a crank or handle 75 by which it may be turned. One side of the member 73 is provided with a series of individual flat gaging surfaces or lands 76 arranged in stepped relation and represented in the form of a development in Fig. 18. See also the dotted lines in Fig. 17 that show the arrangement of these lands. By rotating the handle 75 these lands may be placed selectively in operative position in register with the space between the fingers 72 that straddle a shank-stiffener 12 to establish its position widthwise. Having inserted the forward end of a shank-stiffener between the fingers 72, the operator moves the shank-stiffener toward the toe-end of the sole until it abuts against the land 76 then in operative position, and the shank-stiffener is thus located lengthwise as well as widthwise relatively to the sole. The extent of contact of the confronting parallel surfaces of the fingers 72 with the longitudinal edges of the shank-stiffener is sufficient to control the widthwise position of the rear end of the shank-stiffener.

To determine which one of the lands 76 should be placed in operative position for work of a given style, the operator may make use of any one of a plurality of measuring strips or templets, such as that indicated at 77 in Fig. 15. These strips, differing only in length, will be marked, however desired, with arbitrary symbols that correspond to various styles. Having selected the appropriate strip 77 for the style to be dealt with, and having raised the toe-gaging plate 55 corresponding to an arbitrary master size, the operator will place one end of the strip 77 against the raised gage-plate 55 and will place the other end of the strip under the gaging device 73. Preferably the end placed under the gage 73 will be bent up to provide an ear or abutment 78. When the strip 77 has been placed as aforesaid, the operator will turn the handle 75 to bring one of the lands 76 into contact with the ear 78 as illustrated in Fig. 15. The strip or templet 77 may now be put aside, since it will not be needed again until a recurrence of its style after the member 73 has been set in some other position.

The handle 75 is preferably bored to receive a spring-pressed pin 80 having a knob 81 at one end, and the member 65 is provided with a series of holes 82 each arranged to receive the other end of the pin to lock the member 73 in one of its several positions, the spacing of the holes 82 corresponding to that of the lands 76.

As shown in Figs. 1 and 4, a finger 83 is rigidly secured to the head or block 64 and its lower end is arranged between the fingers 72 that provide a stall for the forward end of the shank-stiffener. The function of the finger 83 is to clamp the forward end of the shank-stiffener against the sole in pursuance of final depression of the treadle 63, as will be understood after further explanation.

The head or block 64 is provided with an arm 84 (Figs. 4 and 5) that extends to the rear and is affixed to the upper end of a vertically movable plunger 85. This plunger is arranged to slide in bearings 86 in the frame 17 and is restrained against rotational movement by an arm 87 affixed thereto (see Fig. 5) and having a forked end arranged to straddle and engage a fixed vertical guide-pin 88. The lower end of the plunger 85 is connected with the treadle 63 by a rod 90 and is normally raised by a tension spring 91 (Fig. 1). This spring normally maintains the head or block 64 in its highest position as shown in Fig. 4, a sufficient distance above the work-supporting platen to avoid obstructing the positioning of a sole on the platen.

When the operator depresses the treadle 63, after locating a sole in the correct position on the platen, the two fingers 72 (Fig. 17) are the first elements of the vertically movable assemblage to engage the upper surface of the sole. The spring 68 yields to permit the bar 65 to continue its downward movement until its lower extremity engages the sole and is arrested thereby, the spring 67 now being effective to maintain clamping pressure of the bar 65 upon the sole while the spring 68 maintains clamping pressure of the fingers 72 against the sole. This stage of operation is illustrated in Fig. 1. Because of their locations, the bar 65 and the fingers 72 bend the sole over the curved surface of the section 18 of the platen, the bend corresponding to the bend 19 of the shank-stiffener. Moreover, the lower edge of the gaging device 73, which is in flush relation to the lower end of the bar 65 also bears upon the sole and has a bending and clamping effect thereon. The resistance of the springs 67 and 68 added to that of the spring 91 is appreciable and indicates to the operator that the sole is firmly clamped against the section 18 of the platen, even though the head or block 64 may not be depressed to its lowest limit. Consequently, the operator will interrupt the downward movement of the treadle 63, to superpose a shank-stiffener 12 upon the clamped sole and locate the shank-stiffener by inserting its forward end between the fingers 72 and against the gaging device 73. Having done so, he depresses the treadle 63 to its lowest limit and thereby causes the finger 83 (Figs. 1 and 4) to clamp the forward end of the shank-stiffener against the clamped sole. The downward pressure of the finger 83 also causes the rear end of the shank-stiffener to be depressed against the heel-seat portion of the sole, and the shank portion of the sole is likewise depressed against the median surface of the molding block 15 by the longitudinal arch portion of the shank-stiffener.

Now the operator superposes a reinforcing piece 11 upon the clamped shank-stiffener and the clamped sole, placing the coated surface of the reinforcing piece toward the sole. At this stage the work-engaging extremities of the jaws 25, 29 and 30 are effective to locate the reinforcing piece 11 widthwise so that it will lie in register with the corresponding portion of the sole, and lengthwise register of the reinforcing piece may be obtained by placing one finger against its rear edge and that of the clamped sole. These steps complete the assembling and locating of the component parts of a shoe-bottom unit which is now in readiness to undergo the operation of pressure-applying mechanism by which they will be permanently united and by which the sole and the reinforcing piece will be molded.

A presser 92 (Figs. 1, 4, 12 and 13) for the purpose last mentioned is arranged to cooperate with the block or molding section 15 of the platen. This presser is preferably made of some suitable elastic and compressible material such as rubber, and its work-engaging surface is preferably reinforced with sheet material 93, such as upper leather, cemented thereto. Moreover, a groove or cavity 94 is preferably formed in this surface to receive the shank-stiffener 12 and that portion of the reinforcing piece 11 that lies upon the shank-stiffener. As shown in Fig. 1 the work-engaging surface of the presser is curved to approximate the arch formation of the shank-stiffener and that of the molding block 15.

The presser is initially raised and maintained at the rear of the molding block 15, out of register therewith (see Fig. 4) to avoid obstructing the assembling of the parts to be united, but when the parts have been assembled and accurately located the operator shifts the presser toward the front of the machine and thereby places it in cooperative relation to the molding block 15, whereupon power-operated mechanism is automatically brought into operation to depress the presser against the work.

The presser 92 is secured to a plunger 95 arranged to slide in bearings 96 carried by an overhanging arm 97, the plunger being surrounded by a strong compression spring 98 that exerts its force downwardly against a flange 99 and provides a factor of resilience in addition to that afforded by the rubber presser 92.

The lower end of the arm 97 is mounted on a pivot-rod or pin 100 carried by a lever 101 from which the presser 92 derives its downward motion to cooperate with a molding block 15. The lever 101 is mounted on a stationary fulcrum-rod 102 supported by the frame 23 and is provided with a cam-roll 103 that runs on an operating cam 104. The cam-roll is maintained in contact with the cam by a compression spring 105 seated in a fixed socket 106 in the frame 23 and arranged to exert its force upwardly against the forward end of the lever 101. The arm 97 is guided and braced by two confronting cheeks 107 formed on the frame 23, and its range of swinging movement is limited by a stop 108 (Fig. 4) and a stop 110 (Fig. 1). The stop 110 locates the presser 92 in register with the molding block 15. The force of gravity normally moves the arm 97 to the rear but the arm is provided with a laterally extending handle 111 by which the operator may swing it toward the front.

The operating cam 104 is affixed to a shaft 112 journaled in the frame 23. A portion of the shaft has the cross-sectional shape illustrated in Fig. 4, and constitutes the driven member of an operating clutch of the well known Horton type. The driving member of the clutch is the hub of a continuously rotating pulley 113 (Fig. 1) loosely mounted on a cylindrical portion of the shaft and counterbored to provide a cylindrical socket in which clutch-rollers 114 and a loose roller-cage 115 are enclosed. The pulley may receive rotation from a belt 116. The cage 115 is a sleeve one end of which projects from its socket in the hub of the pulley and is provided with an exterior nose 117 and a radial knock-off pin 118. The purpose of the nose 117 is to release the rollers 114 from the internal surface of the hub at the end of each rotation of the cam 104, to the end that the presser 92 will execute only one down-stroke for each tripping of the clutch.

The clutch-controlling mechanism operates automatically to throw the clutch out of operation, and for this purpose a stop-member 120 loosely mounted on an extension of the fulcrum-rod 102 is arranged to be moved into and out of the path of rotation of the nose 117. To relieve the stop-member 120 from the harshness of sudden impact by the nose 117, it may be provided with a resilient U-shaped rod 121, one arm of which is rigidly secured thereto by a set-screw 122 and the other arm of which is arranged to be struck by the nose 117. A tension-spring 123 connected to the stop-member moves the latter normally to its stopping position which is illustrated in Fig. 4, and since the sleeve 115 is thus restrained against rotation the driving member of the clutch remains free.

The clutch is set in operation by moving the arm 97 to carry the presser 92 into register with the molding block 15. For this purpose a link 124 is connected to the arm 97 by a pivot-pin 125. This link extends loosely through a cleft in the upper end of the stop-member and is maintained therein by a tension spring 126. When the link is drawn forward by the arm 97 a shoulder 127 on the lower edge of the link engages a tooth or lug 128 on the stop-member 120 and thereby retracts the stop-member out of the path of rotation of the nose 117. The roller-cage 115 of the clutch, being thus released, permits the rollers 114 to grip and drive the shaft. As the sleeve 115 is carried around in rotation the pin 118 strikes the under edge of the link 124 and raises the shoulder 127 far enough to release the lug 128. This release occurs after the nose 117 has passed out of range of the stop-member 120, which is now returned to its stopping position by the spring 123. At the completion of one revolution the nose 117 again engages the stop-member and is arrested thereby, and since the travel of the rollers 114 about the axis of the shaft is also arrested the driving connection of the clutch is interrupted. The subsequent return of the pressure-applying arm 97 to its rear position as shown in Fig. 4 carries the shoulder 127 of the link 124 to the rear of the lug 128 thus reestablishing the potential operating relation of these elements.

Since the work-engaging extremities of the jaws 25, 29 and 30 project initially above the level of the work on the molding block 15 provision is made for depressing them automatically when the presser 92 descends to cooperate with the molding block. It has been hereinbefore stated that these jaws are mounted upon a depressible carriage or slide 33 that is normally raised by a spring 34 shown in Fig. 4. Accordingly, the plunger 95, to which the presser 92 is secured, is provided with a boss 130 in which a hole is bored to receive a plug 131 adjustably secured therein by a set-screw 133. This plug is so situated as to pass over and stop in register with one of the studs 26 when the presser 92 is moved to its forward position over the molding block 15. Consequently, when the presser descends the plug 131 depresses the vertically movable slide 33 and the jaws carried thereby so that the presser does not quite touch the jaws. The effect of depressing the jaws in this manner is illustrated in Fig. 13.

Fig. 12 illustrates in cross-section a sole 10 seated upon the median surface c of the molding block 15, a shank-stiffener 12 superposed upon the sole, a reinforcing piece 11 superposed upon the shank-stiffener, and the presser 92 in co-operative relation to the block 15 but still in its upper position. When the presser descends, its shoulders 99 bend the margins of the reinforcing piece 11 downwardly against the margins of the sole and thereby mold the latter margins against the sloping surfaces b, b and the spheroidal surface a of the block. The shank-stiffener subjects the reinforcing piece 11 to a molding action that exceeds the elastic limit of the material of which that piece is made, and since the material in contact with the upper edges of the shank-stiffener is not only scored thereby but is also appreciably weakened by being sharply bent the tendency of the margins of the reinforcing piece to spring back to a common plane is greatly dissipated. Moreover, the bending of the sole and the reinforcing piece in process of being molded causes their margins to creep relatively one to another before the full force of the molding pressure has been developed. Consequently much, if not all, of the molding of the sole and the reinforcing piece occurs prior to the ultimate development of the bond of adhesion due to the presence of adhesive coatings on their confronting faces.

To counteract the reflex tendency of a molded unit after the molding pressure is removed the sloping surfaces b, b are straight in cross-sectional profile and are steeper than the corresponding cross-sectional profile of the bottom of a last. The transverse bending of the shank-portion of the unit is thus localized in lines adjacent to the shank-stiffener. Although the sole and the reinforcing piece are thus molded to an exaggerated degree while they are under molding pressure (Fig. 13), their reflex tendency cannot be entirely eliminated. Consequently, even if the shank-portion of a composite unit loses some of its crosswise molding when the pressure is removed it will retain approximately the degree of molding illustrated in Fig. 14. It is to be observed in Figs. 12, 13 and 14 that the surface c of the block 15 and the compressible pad 92 cause the shank-stiffener to become embedded in the reinforcing piece 11 without forming a depression in the sole.

Having described my invention, what I claim as new and desire to secure by Letters Patent of the United States is:

1. Apparatus for use in assembling shoe-parts, comprising a sole-molding platen for supporting the parts to be assembled, means for locating a sole in a certain position on said platen, means for locating an unattached shank-stiffener relatively to the sole and in a certain co-operative relation thereto, and pressure-applying mechanism co-operatively related to said platen to mold the sole to the platen and also to mold a reinforcing piece against the shank-stiffener and against the margins of the sole, whereby an adhesive between the contacting faces of the sole and the reinforcing piece will develop a bond of adhesion and maintain the molded form and the assembled relation of the shoe-parts.

2. Apparatus according to the terms of claim 1, in which the lengthwise relation of the sole and the shank-stiffener is established by two gages one arranged to be engaged by an end of the sole lying on said platen and the other movable in a controlled path to and from a certain position on a face of the sole to be there engaged by an end of the shank-stiffener.

3. Apparatus according to the terms of claim 1, in which a sole lying on the platen is located widthwise by two pairs of jaws, those of one pair being movable toward each other to engage opposite edges of the heel-seat portion and those of the other pair being likewise movable to engage opposite edges of the shank-portion of the sole, and means by which the to-and-fro movements of each jaw and its mate are equalized.

4. Apparatus according to the terms of claim 1, in which a pressure-applying mechanism is arranged to clamp the sole against said platen in the region of the ball-line and has provision for locating the forward end of the shank-stiffener in a certain line.

5. Apparatus according to the terms of claim 1, in which a pressure-applying mechanism is arranged to engage and clamp the sole in the region of the ball-line and has supplemental means arranged to clamp the forward end of the shank-stiffener against the sole.

6. Apparatus for use in assembling an unattached sole and a shank-stiffener, comprising curved sole-supporting means, means arranged to locate a sole in a certain position thereon, and treadle-operated means movable in a fixed path to and from a certain position on the sole to conform the latter to a curved surface of said sole-supporting means, said treadle-operated means having provisions for locating a shank-stiffener on the sole in a certain relation to said curved surface.

7. Apparatus for use in assembling an unattached sole and a shank-stiffener, comprising curved sole-supporting means, means arranged to locate a sole in a certain position thereon, treadle-operated means movable in a fixed path to and from a certain position on the sole to conform the sole to a curved surface of said supporting means, and means carried by said treadle-operated means to clamp a stiff curved shank-stiffener against the portion of the sole conformed as aforesaid.

8. Apparatus for use in assembling shoe-parts, comprising a platen and a presser formed and arranged to operate on the shank portion and the heel-seat portion of a sole, mechanism arranged to clamp the ball-portion of the sole against said platen, means combined with said clamping mechanism to clamp the forward portion of an arched shank-stiffener against the clamped sole, and pressure-applying mechanism arranged to operate said presser.

9. Apparatus for use in assembling shoe-parts, comprising a platen formed and arranged to support the forepart and the heel part of a sole in planes offset from each other to provide for arching the shank portion of the sole, mechanism arranged to engage the forepart of the sole and clamp it against said platen, and means carried by said clamping mechanism to cooperate with said platen and thereby clamp the forward portion of a superposed arched shank-stiffener against the clamped sole in the region of the junction of the shank portion and the forepart of the sole.

10. Apparatus for use in assembling shoe-parts comprising a sole-supporting platen including a bed for the heel-part and a bed for the forepart offset from a common plane to provide for arching the shank-portion of the sole, and two individually operable pressure-applying mechanisms one of which is arranged to clamp the forepart of the sole against said forepart-bed and has provision also for clamping the forward portion of a superposed shank-stiffener against the sole, the other one of said mechanisms being arranged to press a reinforcing piece superposed on the shank-stiffener against the latter and against the sole with pressure sufficient to conform the reinforcing piece to both of the other said shoe-parts.

11. Apparatus for use in assembling shoe-parts, comprising a sole-supporting platen, two pairs of movable sole-clamping jaws arranged to engage the longitudinal edges of a sole lying on said platen, means for locating the sole lengthwise, means for communicating motion from one jaw of each pair to its mate to locate the sole widthwise in a certain position on said platen, means movable in a fixed path to and from a certain position on the upper face of the sole to clamp the forepart thereof against said platen and to establish a certain position of the forward end of a shank-stiffener superposed on the sole, and pressure-applying mechanism arranged to mold a superposed piece of flexible sheet-material against the shank-stiffener and against the sole.

12. Apparatus according to the terms of claim 1, in which a gage for locating the sole lengthwise is arranged to be engaged by the toe-end of the sole, and a gage for locating the shank-stiffener lengthwise is movable in a controlled path to and from a certain operative position on the upper face of the sole in the region of the ball-line thereof.

13. Apparatus for use in assembling an unattached sole and a shank-stiffener, comprising sole-supporting means, means arranged to locate a sole in a certain position thereon, a gaging member for locating a shank-stiffener in a certain position on the sole, and a carrier movable in a fixed path to carry said gaging member to and from the upper face of the sole, said gaging member having a series of individual gaging faces in stepped relation and being movably connected to said carrier so that said gaging faces may be placed alternatively in an operative position.

14. Apparatus for use in assembling shoe-parts, comprising a sole-supporting platen having relatively offset portions for the heel part of a sole and the forepart respectively, means arranged to engage and clamp the forepart of a sole against said platen, means arranged to clamp the forward portion of a superposed arched shank-stiffener against the sole, and pressure-applying mechanism arranged to cooperate with said platen to mold a superposed moldable reinforcing piece against the shank-stiffener and the heel part of the sole.

15. Apparatus for use in assembling shoe-parts, comprising a sole-supporting platen having a convex portion arranged to engage the sole in the region of its ball-line, and a work-clamping mechanism arranged to cooperate therewith, said mechanism being provided with yieldable sole-clamping means arranged to conform the sole to said convex portion and with a relatively movable clamping member arranged to cooperate with said convex portion to clamp the forward end of a superposed shank-stiffener against the sole.

16. Apparatus for use in assembling shoe-parts, comprising a sole-supporting platen and a work-clamping mechanism arranged to cooperate therewith, said mechanism being provided with means for locating the forward end of a superposed shank-stiffener in a certain position on the sole and with means arranged to clamp the forward portion of the shank-stiffener against the sole.

17. Apparatus for use in assembling an unattached sole and a shank-stiffener, comprising sole-supporting means, and a treadle-operated assemblage movable in a fixed path to and from the upper surface of the sole, said assemblage comprising individually yieldable means arranged to locate a shank-stiffener widthwise on the sole, individually yieldable means arranged to locate the shank-stiffener lengthwise, and a member arrange to clamp the shank-stiffener against the sole.

18. Apparatus for use in assembling shoe parts, comprising a sole-supporting platen, and two pressure-applying mechanisms arranged to co-operate therewith, one of which is provided with means arranged to clamp the forward portion of a superposed shank-stiffener against the sole, and the other of which is provided with means for molding a superposed moldable reinforcing piece against the shank-stiffener and against adjacent portions of the sole.

19. Apparatus for use in assembling shoe-parts, comprising a sole-supporting platen, and two independently operable mechanisms one of which is provided with means arranged to locate a superposed shank-stiffener in a certain position on a sole and with means arranged to clamp the forward portion of the shank-stiffener against the sole, and the other one of said mechanisms being provided with means for molding a superposed reinforcing piece of moldable sheet-material against the shank-stiffener and against the adjacent portions of the sole.

20. A sole-molding machine comprising a molding form, means arranged to locate a sole in a certain position thereon, means movable in a controlled path to and from a certain position on the upper face of the sole to locate and clamp the forward end of an arched shank-stiffener superposed on the sole, and pressure-applying mechanism arranged to co-operate with said form to mold the shank portion of the sole and a moldable reinforcing piece superposed on the shank-stiffener.

21. A sole-molding machine comprising a molding form, pressure-applying means cooperatively related to said form and movable in a controlled path to and from a position in register therewith, means arranged to locate a sole and a superposed reinforcng piece in a certain position on said form, power-driven operating mechanism arranged to be operatively connected with said pressure-applying means, and controlling means operable by moving said pressure-applying means to said position to establish an operating connection between the pressure-applying means and said power-driven mechanism.

22. A sole-molding machine comprising a molding form having lengthwise and crosswise profiles corresponding to those in the heel-seat and in the shank-portion of a last, pressure-applying means movable laterally to and from a position in register with said form, means arranged to engage opposite edges of a sole on said form and of a reinforcing piece superposed on the sole to locate both the sole and the reinforcing piece relatively to the form, said locating means being yieldably mounted to be displaced by said pressure-applying means, and mechanism arranged to operate said pressure-applying means with pressure sufficient to mold the reinforcing piece and the sole to said profiles of said form.

23. A form for molding the shank-portion of a sole lengthwise and crosswise, having two oppositely sloping surfaces of graduated steepness for engaging the marginal areas of the sole, and a median surface connecting said sloping surfaces and forming sharply defined angles at its intersections with them, each of said surfaces being curved lengthwise in accordance with the longitudinal curvature of the bottom of a last.

24. A form for molding the shank-portion of a sole lengthwise and crosswise, having two oppositely sloping surfaces of graduated steepness for engaging the marginal areas of the sole, and a median surface connecting said sloping surfaces and forming sharply defined angles at its intersections with them, each of said surfaces being curved lengthwise in accordance with the longitudinal curvature of the bottom of a last, and said median surface being straight in cross-sectional profile.

25. A form for molding the shank-portion of a sole lengthwise and crosswise, having two oppositely sloping surfaces of graduated steepness for engaging the marginal areas of the sole, and a median surface connecting said sloping surfaces and forming sharply defined angles at its intersections with them, each of said surfaces being curved lengthwise in accordance with the longitudinal curvature of the bottom of a last, and said sloping surfaces being straight in cross-sectional profile.

26. A form for molding the shank-portion of a sole lengthwise and crosswise, having two relatively wide oppositely sloping surfaces for engaging the marginal areas of the sole, and a relatively narrow median surface connecting said sloping surfaces, each of said surfaces being curved lengthwise in accordance with the longitudinal curvature of the bottom of a last.

27. A form for molding the shank-portion and the heel-seat portion of a sole, having a spheroidal surface for engaging the heel-seat portion, two oppositely sloping surfaces of graduated steepness for engaging the marginal areas of the shank-portion, and a median surface connecting said sloping surfaces and forming sharply defined angles at its intersections with them, said sloping surfaces and said median surface being curved lengthwise in accordance with the longitudinal curvature of the bottom of a last.

28. In a machine for assembling an unattached sole and another shoe part; sole-supporting means, a pair of interconnected sole-positioning jaws constrained to move equally toward and from each other and arranged to locate a sole widthwise in a certain relation to said means, and means arranged to register the other said shoe part in a certain location for attachment to the sole, one of said jaws being provided with a sole-engaging member adjustable relatively thereto widthwise of the sole to vary the conjoint sole-locating effect of the jaws.

29. In a machine for assembling an unattached sole and another shoe part; sole-supporting means, a pair of interconnected sole-positioning jaws constrained to move equally toward and from each other and arranged to locate a sole widthwise in a certain relation to said means, and means arranged to register the other said shoe part in a certain location for attachment to the sole, one of said jaws being provided with a sole-engaging member adjustable relatively thereto widthwise of the sole to vary the conjoint sole-locating effect of the jaws and with means arranged to lock said member in a constant position in which the conjoint locating effect of the jaws is symmetrical.

30. In a machine for assembling an unattached sole and another sole part; sole-supporting means, a pair of interconnected sole-positioning jaws constrained to move equally toward and from each other and arranged to locate a sole widthwise in a certain relation to said means, and means arranged to register the other said sole part in a certain location for attachment to the sole, one of said jaws being provided with a sole-engaging member adjustable relatively thereto widthwise of the sole to vary the conjoint sole-locating effect of the jaws, and with spaced means arranged to lock said member in different positions, one for a right sole and the other for a left sole, in each of which positions the conjoint locating effect of the jaws is to locate one of said parts non-symmetrically with respect to the other.

31. In a machine for assembling an unattached sole and another sole part; sole-supporting means, a pair of interconnected sole-positioning jaws movable equally toward and from each other and arranged to locate a sole widthwise, and means arranged to locate the other said sole part in a certain position for attachment to the sole, one of said jaws being provided with a sole-engaging member adjustable relatively thereto widthwise of the sole to vary the conjoint sole-locating effect of the jaws, and with locking members adjustable toward and from each other for maintaining said sole-engaging member alternatively in two different positions, one for a right sole and the other for a left sole.

32. In a machine for assembling an unattached sole and a shank-stiffener; sole-supporting means, two pairs of movable sole-positioning jaws arranged to locate a sole widthwise thereon, means arranged to locate the shank-stiffener in a certain position for attachment to the sole, and means by which movement of each of said jaws is communicated inversely but with equal amplitude to its mate, one of said jaws being provided with a sole-engaging member adjustable relatively thereto widthwise of the sole to locate the sole alternatively in parallel relation and in skewed relation to the shank-stiffener.

33. In combination with sole-supporting means of an appartus for performing an operation on a sole, a jig cooperatively related to said sole-supporting means, a holder formed and arranged to be detachably mounted on said jig, a series of individual gage-plates stacked in face-to-face relation one against another in said holder, each of said plates having inclined slots through which parallel guide-rods extend, said guide-rods being affixed to said holder and said plates being individually movable edgewise on them within the range of said slots whereby they may be shifted selectively to and from their respective work-engaging positions.

34. In a sole-molding machine, two co-operatively related molding members one of which is movable toward the other to apply sole-molding pressure, means arranged to locate a sole in a certain position on one of said members, means arranged to locate an unattached shank-stiffener in a certain position on the sole, and mechanism for operating said movable member to attach the shank-stiffener and a superposed reinforcing piece to the sole and to mold the sole and the reinforcing piece.

JOHN M. WHELTON.